United States Patent
Schmid et al.

(10) Patent No.: US 12,390,752 B2
(45) Date of Patent: Aug. 19, 2025

(54) FILTER ELEMENT COMPRISING A FILTER MEDIUM FOLDED IN A ZIG-ZAG-SHAPE WITH DISCONTINUOUS END-EDGE BONDING, AND METHOD FOR PRODUCING SAME

(71) Applicant: MANN+HUMMEL GmbH, Ludwigsburg (DE)

(72) Inventors: Daniel Schmid, Sachsenheim (DE); Timo Dirnberger, Marbach (DE); Andreas Weber, Freiberg (DE); Markus Schmidl, Pilsting (DE); Christoph Goldbrunner, Dingolfing (DE); Nadine Donauer, Fellbach (DE); Philipp Hettkamp, Steinheim (DE); Martin Lehmann, Karlsruhe (DE); Markus Wagner, Arnstorf (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 398 days.

(21) Appl. No.: 18/091,164

(22) Filed: Dec. 29, 2022

(65) Prior Publication Data
US 2023/0149842 A1 May 18, 2023

Related U.S. Application Data

(63) Continuation of application No. PCT/EP2021/071361, filed on Jul. 30, 2021.

(30) Foreign Application Priority Data

Jul. 31, 2020 (DE) .......................... 102020120247.4

(51) Int. Cl.
*B01D 46/00* (2022.01)
*B01D 46/10* (2006.01)
*B01D 46/52* (2006.01)

(52) U.S. Cl.
CPC ......... *B01D 46/0001* (2013.01); *B01D 46/10* (2013.01); *B01D 46/106* (2013.01);
(Continued)

(58) Field of Classification Search
CPC .......................... B01D 46/521; B01D 46/523; B01D 46/0001; B01D 46/10; B01D 2265/04; B01D 2271/027; B01D 2279/30
See application file for complete search history.

(56) References Cited

U.S. PATENT DOCUMENTS 5,622,583 A * 4/1997 Ernst .................... B31D 5/0082
156/271
9,308,482 B2 4/2016 Kaiser
(Continued)

FOREIGN PATENT DOCUMENTS

CN 1978885 A 6/2007
CN 200961548 Y 10/2007
(Continued)

*Primary Examiner* — Robert Clemente (57) ABSTRACT

A filter element for filtering a fluid has a filter body with a filter medium folded in a zigzag shape with folds extending in a fold direction. The filter body has an end edge bonding which seals fold ends of the folds. The filter body has an outer contour with recesses. The end edge bonding, in a region of the recesses of the outer contour of the filter body, is embodied discontinuously. The end edge bonding has at least one outwardly positioned first bonding segment and an inwardly positioned second bonding segment, viewed in the fold direction. The inwardly positioned second bonding segment, in a transverse direction relative to the fold direction, is arranged at a spacing to the at least one outwardly positioned first bonding segment. The at least one outwardly positioned first bonding segment and the inwardly positioned second bonding segment bond at least one common fold.

21 Claims, 6 Drawing Sheets

(52) U.S. Cl.
CPC ........ B01D 46/521 (2013.01); *B01D 2265/04* (2013.01); *B01D 2271/027* (2013.01); *B01D 2279/30* (2013.01)

(56) References Cited

U.S. PATENT DOCUMENTS

| | | | |
|---|---|---|---|
| 9,895,640 B2 | 2/2018 | Sudermann et al. | |
| 10,343,099 B2 | 7/2019 | Kaiser | |
| 10,384,158 B2 | 8/2019 | Pflueger et al. | |
| 10,662,905 B2 | 5/2020 | Dirnberger et al. | |
| 2014/0318092 A1 | 10/2014 | Rieger et al. | |
| 2015/0114191 A1* | 4/2015 | Roehrig | A47J 43/0716 83/14 |
| 2016/0074794 A1* | 3/2016 | Sudermann | B01D 46/10 55/484 |
| 2016/0214052 A1 | 7/2016 | Moser et al. | |
| 2016/0263513 A1* | 9/2016 | Pflueger | F02M 35/0245 |
| 2017/0182448 A1* | 6/2017 | Sudermann | B01D 46/10 |
| 2017/0182588 A1* | 6/2017 | Sudermann | B01D 46/10 |
| 2018/0056225 A1* | 3/2018 | Dirnberger | B01D 39/18 |
| 2018/0207566 A1 | 7/2018 | Stanhope et al. | |
| 2018/0361300 A1 | 12/2018 | Roehrig et al. | |
| 2019/0063380 A1 | 2/2019 | Dirnberger et al. | |
| 2024/0269589 A1* | 8/2024 | Schmid | B01D 46/4236 |

FOREIGN PATENT DOCUMENTS

| | | | |
|---|---|---|---|
| CN | 203374400 U | 1/2014 | |
| CN | 204610087 U | 9/2015 | |
| DE | 362955 C | 11/1922 | |
| DE | 102014016672 A1 * | 5/2015 | ............ B01D 39/18 |
| DE | 102016217458 A1 | 3/2018 | |

* cited by examiner

FILTER ELEMENT COMPRISING A FILTER MEDIUM FOLDED IN A ZIG-ZAG-SHAPE WITH DISCONTINUOUS END-EDGE BONDING, AND METHOD FOR PRODUCING SAME

CROSS-REFERENCE TO RELATED APPLICATIONS

This application is a continuation application of international application No. PCT/EP2021/071361 having an international filing date of 30 Jul. 2021 and designating the United States, the international application claiming a priority date of 31 Jul. 2020 based on prior filed German patent application No. 10 2020 120 247.4, the entire contents of the aforesaid international application and the aforesaid German patent application being incorporated herein by reference.

BACKGROUND OF THE INVENTION

The invention concerns a filter element for filtering a fluid, in particular air, with a filter medium folded in a zigzag shape and provided with an end edge bonding for sealing its fold ends. Moreover, the invention concerns a method for producing such a filter element.

The intake air of internal combustion engines is usually guided prior to entering the engine through an air filter with a filter housing and filter element arranged therein in order to separate dirt particles contained in the intake air from the intake air. Such an air filter is disclosed, for example, in DE 102 31 696 A1. The filter element comprises the shape of a flat cuboid and comprises a filter medium of paper or filter nonwoven which is folded in a zigzag shape. The folds at one side of the filter medium delimit a main filter surface for the raw air side of the filter element and the folds which are lying in the parallel plane of the opposite side of the filter element delimit the filter surface for the clean air side. A required sealing action of the fold ends of the filter medium is achieved by means of a so-called end edge bonding which, for example, can be realized by application of a hot glue bead on the filter medium, spray bonding, PUR foam application or a so-called side strip bonding.

DE 10 2016 217 458 A1 discloses a trapezoidal or triangular air filter insert with a filter material folded in a zigzag shape and comprising no parallel side edges but tapering in one direction. In the region of the side edges, sealing adhesive traces extend orthogonally to the fold axes and displaced relative to each other in axial direction. Neighboring adhesive traces do not bond common folds but can end at a convex fold peak of folds bordering each other.

US 2018/0207566 A1 describes a filter with a filter medium folded to deep folds wherein the folds can be held spaced apart from each other by adhesive beads. Radial outer sides positioned opposite each other can be sealed by a circumferentially extending adhesive bead that follows a curved course of the outer sides.

The filter media folded in a zigzag shape are manufactured usually of a filter medium blank. When an adhesive bead is employed for forming the end edge bonding, the filter medium blank in general is first folded and subsequently unfolded again in order to provide it with the adhesive bead along its two oppositely positioned longitudinal sides which form the end edges of the future folds. After erecting (i.e., folding) the filter medium blank again, the end edge bonding can be formed in this way.

In practice, the filter elements must have occasionally a shape deviating from the classic—strictly cuboid or strictly circular cylindrical—configuration. In this way, for example, the installation space available for the filter element of a filter housing provided for receiving the filter element can be utilized comprehensively. When the filter element or the filter body formed of the filter medium, for example, has an outer contour with one or a plurality of recesses, for example, steps, ramps or indentations, the aforementioned end edge bonding by means of an adhesive bead application is made difficult. For example, the adhesive application on the filter medium blank along an adhesive application path, which follows the recess and is non-linear and/or extends at a slant in relation to the movement axis along which the filter medium blank and the adhesive application device are moved during the application of adhesive, requires the use of two-dimensional high-dynamically movable adhesive application devices that are complex, prone to wear and disturbances, and are therefore expensive.

The mass production of filter elements requires that the filter element blanks and a respectively employed adhesive application device must be moved at great speed relative to each other, which in general cannot be achieved with the aforementioned movable adhesive application devices. Moreover, it has to be taking into consideration that the adhesive application path along the longitudinal side of the filter medium blank provided with the recess must not surpass a maximum angle relative to the application direction or length extension of the filter medium blank so that the adhesive bead sections or adhesive application segments at oppositely positioned flanks of the folds to be formed of the filter medium can contact each other and bond to each other fluid-tightly when erecting the filter medium blank. If this is not the case, leakage and thus an increased reject rate may occur in the production of the filter elements.

It is therefore the object of the invention to provide a filter element of the aforementioned kind with good filter surface utilization that can be produced with simple technical means in a cost-efficient way in mass production and, at the same time, with a reject rate as small as possible. Moreover, a method for manufacturing such a filter element is to be provided.

SUMMARY OF THE INVENTION

The object concerning the filter element is solved according to the invention by a filter element for filtering a fluid, in particular air, with a filter body with a filter medium folded in a zigzag shape, whose folds extend in a fold direction and which is provided with an end edge bonding for sealing its fold ends, which, in the region of at least one recess of the outer contour of the filter body, is embodied discontinuously and comprises at least one outwardly arranged first bonding segment, and comprises a second bonding segment inwardly positioned in fold direction, wherein the second bonding segment, in transverse direction to the fold direction, is arranged at a spacing to the first bonding segment, and wherein the two bonding segments bond at least one common fold.

The method according to the invention for producing such a filter element comprises the following steps:
  a) providing a filter medium blank which, for forming the filter body, is to be folded in a zigzag shape along predetermined fold lines extending from a first longitudinal side of the filter medium blank to an oppositely arranged second longitudinal side;

b) producing at least one recess in the region of at least one of the two longitudinal sides of the filter medium blank;

c) defining a respective first linear adhesive application path along each one of the two longitudinal sides of the filter medium blank, wherein the two adhesive application paths are arranged so as to extend at a spacing to each other and one of the two adhesive application paths intersects the at least one recess;

d) defining at least a second linear adhesive application path along the longitudinal side of the filter medium blank provided with the recess, wherein the second adhesive application path is arranged so as to extend between the two first adhesive application paths and parallel thereto, without intersecting the recess;

e) applying adhesive on the filter medium blank along the two first adhesive application paths, wherein the adhesive application along the first application path follows the outer contour of the filter medium blank in transverse direction to the fold direction and in the region of the at least one recess is interrupted or stopped and, instead, adhesive is applied along the second adhesive application path on the filter medium blank in such a way that the adhesive application along the second adhesive application path is applied in transverse direction to the fold direction at a spacing from the first adhesive application path, and wherein the two adhesive application paths bond at least one common fold of the filter medium blank; and f) erecting the filter medium blank to a filter medium folded in a zigzag shape so that the fold ends of the filter medium are sealed by means of the end edge bonding formed through the adhesive application.

Preferred further embodiments of the invention are provided in the dependent claims as well as in the description.

The filter element according to the invention serves for filtering a fluid, in particular air, in particular the intake air of an internal combustion engine but also fresh air for the passenger compartment of a motor vehicle, rail vehicle or the like. The filter element comprises a filter medium folded in a zigzag shape and provided with an end edge bonding for sealing its fold ends. According to the invention, the end edge bonding in the region of a recess of the outer contour of the filter medium is discontinuously realized; in other words, the end edge bonding comprises gaps along the course of the end edge bonding or is comprised of a plurality of separately embodied adhesive trace sections. Described illustratively, the manufacture of the end edge bonding is carried out by means of a process with temporal and/or spatial interruptions. The folds of the filter element extend in fold direction between two oppositely positioned longitudinal sides. Transverse to the fold direction, the folds follow each other between two oppositely positioned end faces.

The end edge bonding comprises in this context at least one first bonding segment which in fold direction is outwardly positioned, i.e., neighboring a longitudinal side. Preferably, the first bonding segment follows the outer contour of the folded bellows in transverse direction relative to the fold direction, in particular in a straight line. The first bonding segment is embodied in the region of a recess preferably discontinuously. Moreover, the end edge bonding comprises at least one inwardly positioned second bonding segment relative to the fold direction, wherein the second bonding segment is arranged spaced apart from the first bonding segment in transverse direction relative to the fold direction and wherein the two bonding segments bond at least one common fold. In direction of the folds, the bonding segments are thus spaced apart from each other and typically do not contact each other. In other words, the bonding segments are spaced apart from each other in fold direction and in transverse direction relative to the fold direction, wherein in particular end points of the adhesive segments are spaced apart from each other in the transverse direction relative to the fold direction. In this context, a fold in the meaning of the invention is a region of the filter medium which at the clean side extends from fold tip to fold tip and thus encompasses in the sequence a fold tip, a fold bottom, and a further second fold tip. In case that the filter medium comprises an inwardly positioned cutout, the end edge bonding transverse to the fold direction must completely bond at least the fold that is cut by the cutout. Clearly, both tips which form the fold at the clean side must thus be bonded transversely to the fold direction.

In contrast to an end edge bonding carried out without gaps, the manufacture of the filter element can be simplified in this way with respect to the process and, as a whole, can be realized more cost-efficiently. In particular, the use of the aforementioned high-dynamic adhesive application device is no longer needed. Instead, the adhesive can be applied to the filter medium blank with minimal technical expenditure, for example, by means of a conventional adhesive application device with a plurality of stationarily arranged application nozzles. Moreover, due to the discontinuously embodied end edge bonding, a large functionally utilizable filter surface of the filter body can be realized.

The sealing effect of the end edge bonding is achieved in principle only jointly by its first and second bonding segments. The first bonding segment alone is not sufficient to seal the end edges at a longitudinal side of the filter body.

Adhesive in the meaning of the invention is a non-metallic material that can connect materials by surface adhesion (adhesion) in such a way that the connection has a sufficient inner strength (cohesion). Preferably, the adhesive is based on one or a plurality of organic compounds. Particularly preferred, the adhesive is a hot melt adhesive (also referred to as hot melt), wherein the hot melt adhesive is a thermally meltable adhesive system which develops cohesion (inner strength) by cooling. Hot melt adhesives can be thermoplastic or reactive. Thermoplastic hot melt adhesives can be reversibly melted. Reactive hot melt adhesives exhibit during or after cooling chemical cross-linking reactions. Suitable base polymers for hot melt adhesives encompass polyamides (PA), polyethylene (PE), amorphous poly-alphaolefins, ethylene-vinyl acetate (co)polymers (EVAC), polyester elastomers (TPE-E), polyurethane elastomers (TPE-U), copolyamide elastomers (TPEA), and vinylpyrrolidone/vinyl acetate copolymers.

The recess of the outer contour of the filter medium according to the invention can be configured as a step, a ramp, a rounded portion, or as an indentation. The indentation is to be understood here as a recess of the edge section of the filter medium which is rectangular or is concavely curved in the direction of the oppositely positioned edge section. In case of the indentation, the second bonding segment with its two end sections is arranged at both sides of the indentation (in the direction of the longitudinal side provided with the end edge bonding) in overlap with a first bonding segment of the end edge bonding, respectively, transverse to the fold direction of the end edge bonding. For forming the recess, in particular an indentation or rounded portion, the outer contour can extend at least in sections in a curved shape—for an indentation as mentioned above concavely curved, for a rounded portion convexly curved. When the recess is formed in a corner region of the filter body, a one-side overlap of the second bonding segment with the first bonding segment is sufficient here. Care should be taken that every second bonding segment thus overlaps the recess transversely to the fold direction at least partially, in case of a single second bonding segment completely.

The filter element can be provided according to the invention with a passage cutout and/or with an end face recess, wherein, at both sides of the passage cutout, the folds are sealed respectively by bonding of their end edges which are facing the passage cutout or the end face recess. This bonding can also be produced by an end edge bonding in a manner corresponding to the old one by an adhesive application with stationarily arranged adhesive application nozzles in a simple and inexpensive manner.

In an embodiment, the first bonding segment follows the outer contour of the filter body in a straight line. In other words, the first bonding segment is thus arranged linearly following, in particular parallel to, the outer contour. This has the advantage that a safe sealing action with a minimal adhesive use for the first bonding segment and provision of a predetermined well-utilized filter surface are possible. Even in case of a curved outer contour, the first bonding segment can extend in a straight line transversely to the fold direction; the distance between the first bonding segment and the outer contour varies then corresponding to the curvature of the outer contour. In special cases, the first bonding segment can extend curved, in particular for a curved outer contour of the filter element. In this way, the utilizable filter surface can be further maximized.

In a preferred embodiment, the second bonding segment is embodied discontinuously relative to the first bonding segment. The arrangement comprises gaps; in other words, the end edge bonding has gaps in the course of the end edge bonding. Clearly described, the manufacture of the second bonding segment is realized by means of a process with temporal and/or spatial gaps. This has the advantage that a reliable sealing action with optimal adhesive use and optimal provision of filter surface is possible. Particularly preferred, the second bonding segment extends in this context transversely to the fold direction in a straight line so that the advantages are additionally optimized. In special cases, the second bonding segment can extend curved. In this way, the second bonding segment in case of a greater recess can follow the curved course of the latter in order to further maximize the utilizable filter surface.

The first and/or second bonding segment can be discontinuous in themselves. In other words, they can be comprised of a plurality of sections which are separate from each other.

Alternatively, it is however also conceivable that the first and/or the second bonding segment are continuously embodied. The discontinuity of the end edge bonding is manifested in this respect in spaced-apart arrangement of the two bonding segments. In principle, one bonding segment projects, transversely to the fold direction, at least at one end past the other bonding segment. This embodiment is suitable in particular for filter elements in which the recess is a rounded portion.

In a further embodiment, the second bonding segment, which is spaced apart from the first bonding segment in transverse direction to the fold direction, begins and ends at least with the outer contour of the respective recess, or begins and ends relative to this outer contour at a spacing thereto. This has the advantage that the filter element acts in a stabilizing manner in the region of a clamping device between housing top part and housing bottom part. In this way, a distortion of the sealing contours of the housing parts during clamping in particular in the corner regions of the housing is at least reduced, or prevented, and the sealing action is additionally reliably ensured in this way.

In a further embodiment, the recess of the outer contour is arranged in a corner region of the filter body.

In a further embodiment, the outer contour of the filter body comprises a plurality of recesses. In a further embodiment, the filter medium comprises a passage cutout, wherein the folds of the filter body at both sides of the passage cutout are sealed relative to the passage cutout by an additional bonding.

The end edge bonding can comprise a plurality of second bonding segments which, in transverse direction to the fold direction, are spaced apart from each other, respectively. Pairs of neighboring second bonding segments bond at least one common fold, respectively. In this way, the recess can be sealed in a stepped shape. This is in particular advantageous in case of greater recesses in order to enlarge the utilizable filter surface.

The filter element according to the invention can be embodied as a so-called plate or flat filter element or, alternatively, as a round filter element. In the first mentioned embodiment, the filter medium defines a filter plane. In the last mentioned embodiment, the filter medium or the filter body formed thereof is arranged in an annular shape about the longitudinal axis of the filter element and preferably can be flowed through by the fluid to be filtered in a radial direction relative to the longitudinal axis. The filter medium of the round filter element can be arranged between two end discs and can be glued or welded to the end disks or can be arranged so as to be held embedded in the material of the end disks. The plate or flat filter element can be oval, stadium-shaped or round as a whole or in sections thereof.

The filter element can comprise a circumferentially extending seal, preferably arranged at the clean side. For example, the clean-side seal can be glued, welded, foamed or molded to the filter body. The seal is comprised preferably of a rubber-elastic deformable material. Particularly preferred, the seal is comprised of PUR (polyurethane), in particular closed-cell polyurethane foam. Extending from the outer contour, the seal covers in the region of the recess transverse to the fold direction at least one fold which is bonded by the first bonding segment as well as by the second bonding segment. The seal prevents, on the one hand, that air can laterally bypass the filter body. For this purpose, the seal can contact a filter housing. On the other hand, the seal prevents by covering the commonly bonded fold that air can flow between pairs of neighboring bonding segments into the folds that have been cut in order to produce the recess. Preferably, the seal covers, extending from the outer contour, at least three folds that are bonded by a pair of bonding segments. This is advantageous in regard to tolerances of the manufacturing process.

The method according to the invention for producing an aforementioned filter element comprises the following steps:
 a) providing a filter medium blank which, for forming the filter body, is to be folded in a zigzag shape along predetermined fold lines extending from a first longitudinal side of the filter medium blank to an oppositely arranged second longitudinal side;
 b) producing at least one recess in the region of one of the two longitudinal sides of the filter medium blank;
 c) defining a respective first linear adhesive application path along each of the two longitudinal sides of the filter medium blank, wherein the two adhesive application paths are arranged so as to extend parallel to each other and one of the two adhesive application paths intersects the at least one recess;

d) defining a second linear adhesive application path along the longitudinal side of the filter medium blank provided with the recess, wherein the second adhesive application path is arranged so as to extend between the two first adhesive application paths and spaced apart thereto, without intersecting the recess;

e) applying adhesive on the filter medium blank along the two first adhesive application paths, wherein the adhesive application follows the outer contour of the filter medium blank in transverse direction to the fold direction along the first adhesive application path and, in the region of the at least one recess, is interrupted or stopped and, instead, adhesive is applied along the second adhesive application path on the filter medium blank in such a way that the adhesive application along the second adhesive application path is applied in the transverse direction to the fold direction at a spacing from the first adhesive application path, and wherein the two adhesive application paths bond at least one common fold of the filter medium blank; and f) erecting the filter medium blank to a zigzag-shaped folded filter medium so that the fold ends of the filter medium are sealed by means of the end edge bonding formed by the cured adhesive application.

Due to the manufacturing process according to the invention, the filter element can be manufactured in a simple and cost-efficient manner as well as with simple technical means. Thus, the adhesive can be applied with only minimal technical expenditure onto the filter medium blank by means of a plurality of adhesive application nozzles which can be arranged relative to each other invariant with respect to spacing. In this way, the great relative speed required during mass production of filter elements at which the respective filter element blanks are guided past the adhesive application device can be realized without problem. It is understood that the respective adhesive application nozzles must be provided with an adhesive dispensing valve which has a corresponding temporal response behavior. Such high-speed valves have been established however on the market for some time now and are readily available.

BRIEF DESCRIPTION OF THE DRAWINGS

The invention will be explained in the following in more detail with the aid of embodiments illustrated in the drawings. The illustrated embodiments have exclusively exemplary character for describing the invention.

DESCRIPTION OF PREFERRED EMBODIMENTS

Figure 1:
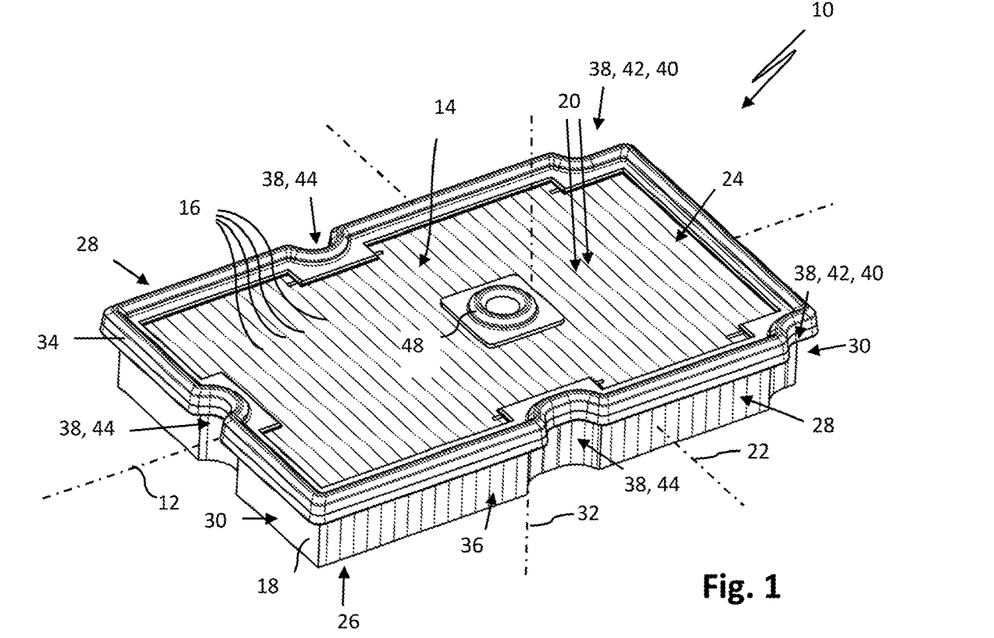
FIG. 1 shows in a perspective view a plate filter element with a filter body with a filter medium folded in a zigzag shape, wherein the filter body has an outer contour with recesses and the folds of the filter body are sealed relative to the longitudinal side by a discontinuous end edge bonding.
Figure 2:
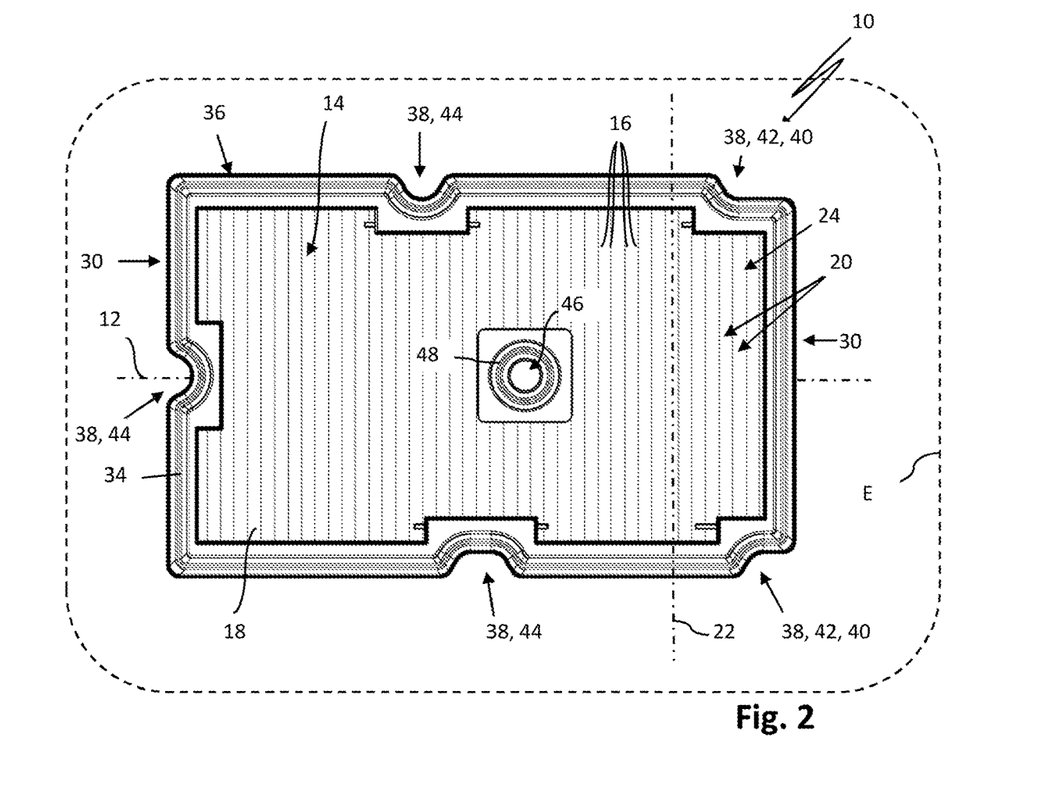
FIG. 2 shows the filter element according to FIG. 1 in a plan view.

In FIGS. 1 and 2, a filter element 10 is illustrated that is embodied in the form of a so-called plate or flat filter element. The longitudinal axis of the filter element 10 is identified by 12. The filter element 10 can be embodied in particular as an air filter element for filtering air for an internal combustion engine but also as a cabin air filter of a motor vehicle. Other technical fields of use are conceivable. The flat filter element 10 comprises a filter body 14 that is formed by a filter medium 18 folded in a zigzag shape along fold lines 16. The folds 20 of the filter medium 18 extend each along a fold direction 22 which extends orthogonally to the longitudinal axis 12 of the filter element.

The filter medium 18, depending on the field of use of the filter element 10, can be comprised, for example, of cellulose material or another suitable material. The filter medium 18, depending on the field of use, can be of a single layer or multilayer configuration. The filter medium can be provided, as needed, with a coating (not illustrated).

The filter element 10 comprises a top side 24 and a bottom side 26, longitudinal sides 28 arranged in pairs opposite each other, respectively, and end faces 30 arranged in pairs opposite each other. In operation, the filter medium 18 can be flowed through by the respective fluid to be filtered in the direction of the flow axis identified by 32.

A circumferentially extending seal 34 is arranged at the filter body 14. The seal 34 can be glued, welded, foamed or molded to the filter body 14. The seal 34 is comprised preferably of a rubber-elastic deformable material such as, for example, PUR (polyurethane). It is understood that the seal 34 for the purpose of a sufficient sealing seat at the respective sealing surfaces of a filter housing provided for receiving the filter element 10 can also have a different shape and, for example, can be provided with at least one or a plurality of radial and/or protruding sealing lip(s).

The filter element 10 or the filter body 14 comprises according to FIGS. 1 and 2 an outer contour 36 which deviates from the strict rectangular basic shape with a plurality of recesses 38. In the corner region 40 of the filter element 10, here a respective recess 38 is formed as a preferably rounded step 42 (=step-shaped cutout). In the region of a longitudinal side 28 of the filter element 10, the respective recess 38 is in the form of an indentation 44 which here is embodied rounded in an exemplary manner. A further recess 38 embodied at the end face at the filter body is embodied in the same manner as an indentation 44. It is understood that the indentations 44 can also have a different shape and, for example, can be embodied rectangular. The seal 34 follows preferably the outer contour 36 of the filter body 14.

The filter body 14 can be provided with a passage cutout 46. The latter can serve, for example, for passing through a fastener or another component of a filter housing (not illustrated) provided for receiving the filter element. In the region of the passage cutout 46, a seal element 48 can be arranged. In a manner appropriate for the seal 34, the seal element 48 can be welded to the filter body 14 or the filter medium 18, can be glued, molded or foamed to the filter body 14 or filter medium 18.

Figure 3:
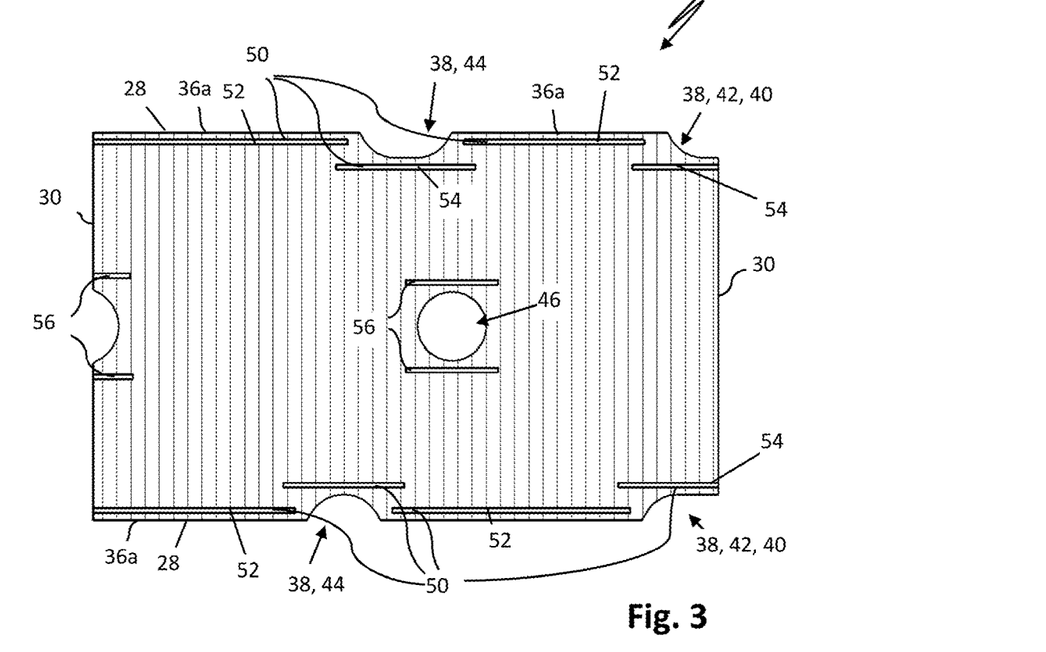
FIG. 3 shows the filter body of the filter element according to FIG. 1 in an exposed plan view.

According to the exposed view of the filter body 14 which is illustrated in FIG. 3, this region of its two longitudinal sides 28 comprises a so-called end edge bonding 50 which serves for sealing fold ends of the filter medium 18. Such an end edge bonding 50 serves at the same time for stiffening as well as mutual mechanical position stabilization of the folds 20 of the filter medium 18. It should be noted that the end edge bonding in the region of a respective recess 38 of the outer contour 36 of the filter body 14 is embodied discontinuously. The end edge bonding does not extend here from one end face 30 of the filter body 14 to the other one.

The end edge bonding 50 extends in the region of the longitudinal sides 28 along an outer contour section 36a of the filter body 14 which is in particular straight and—in relation to the longitudinal axis 12—extends parallel. The end edge bonding 50 comprises an outer first bonding segment 52 which is arranged so as to follow the outer contour 36, in particular the outer contour section 36a of the filter body 14 in longitudinal direction 12 (here transverse to the fold direction 22), and in particular so as to extend at a spacing to the outer contour section 36a, in particular so as to extend parallel thereto. In a projection onto the plane E, the first bonding segment 52 is preferably embodied to extend linearly. It should be noted that the first bonding segment 52 extends preferably up to or almost to the recess 38 of the outer contour 36. In relation to the recess 38, the bonding segment 52 is thus embodied discontinuous with respect to the outer contour 36. In the region of the recess 38, the folds 20 which are extending to the recess 38 are at least partially, preferably completely, sealed by a second bonding segment 54. The second bonding segment 54 is arranged displaced in fold direction relative to the first bonding segment 52 inwardly, i.e., toward the respective other longitudinal side 28. The second bonding segment 54, in transverse direction to the fold direction, is arranged at a spacing to the first bonding segment 52. The two bonding segments 52, 54 bond at least one common fold 20. The first bonding segment(s) 52 and the respective correlated second bonding segment 54 can be arranged preferably each at a uniform spacing relative to the outer contour of the filter body.

In the region of the passage cutout 46, the folds 20 of the filter body which are cut through by the passage cutout 46 are sealed toward the passage cutout by a respective bonding 56. This applies in the same way for those folds 20 of the filter body 14 which in the region of an end face 30 of the filter body 14 are cut through by a recess 38. The bondings 56 are embodied to extend linearly and strictly axially in their projection onto the plane E defined by the filter body.

Figure 4:
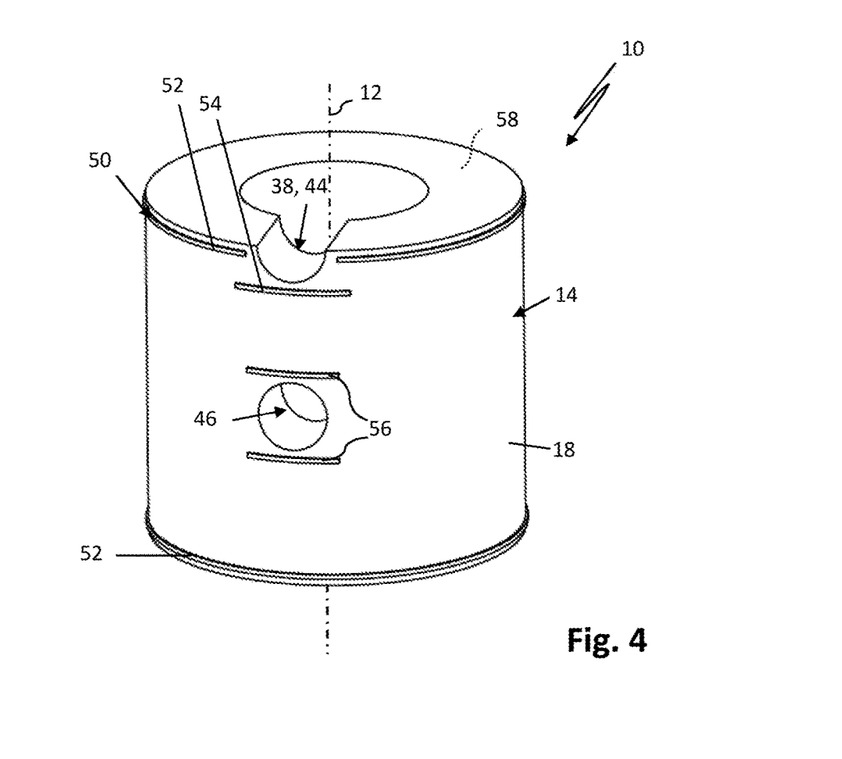
FIG. 4 shows a round filter element with a filter body with a filter medium folded in a zigzag shape, wherein the filter body has an outer contour with a recess and in the region of the recess is provided with a discontinuously embodied end edge bonding.
Figure 5:
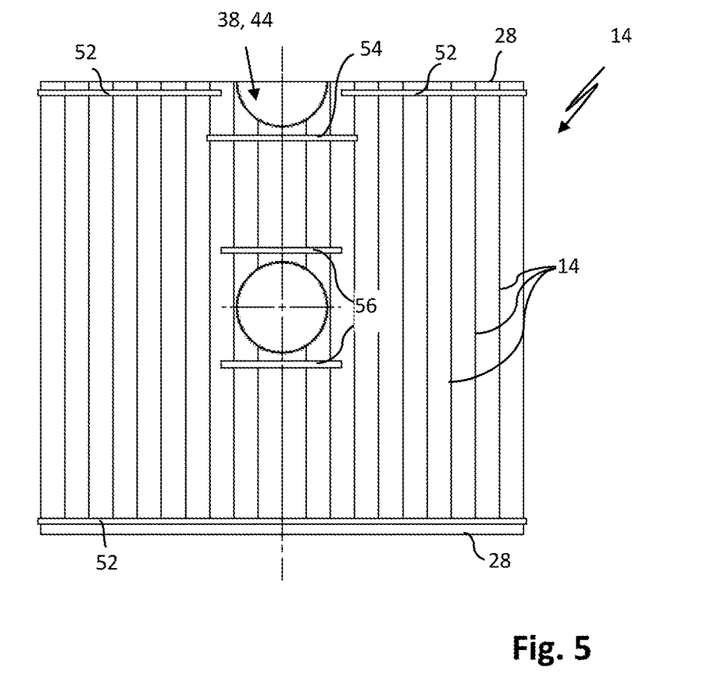
FIG. 5 shows the filter medium of the filter body according to FIG. 4 in partially developed state, in plan view.

In FIG. 4, a further embodiment of the filter element 10 according to the invention is illustrated that is in the form of a so-called round filter element. The filter element 10 comprises a filter body 14 of a filter medium 18 folded in a zigzag shape, which is annularly arranged in relation to the longitudinal axis 12 of the filter element 10. The filter body 14 surrounds thus the longitudinal axis 12 of the filter element completely circumferentially in a radial direction relative to the longitudinal axis 12. The filter body 14 in this configuration can be flowed through by the fluid to be filtered in a radial direction relative to the longitudinal axis 12, preferably from the exterior to the interior. The filter medium 18, as needed, can be arranged so as to be held in axial direction between two end discs 58. In this case, the filter medium 18 can be glued to the end disks, welded or can be arranged so as to be held embedded in the material of the end disks 58. In the region of the illustrated recess 38, in an exemplary fashion embodied in the form of an indentation, of the outer contour 36 of the filter medium 18 of filter body 14, the end edge bonding 50 is here also embodied discontinuously. In FIG. 5, the filter medium 18 is illustrated in the developed but still folded state. The first and second bonding segments 52, 54 of the end edge bonding 50 extending in circumferential direction and arranged displaced relative to each other in the direction of extension of the folds 20 can be seen well in the region of the illustrated recess 38 of the outer contour 36 of the filter medium 18.

Figure 6:
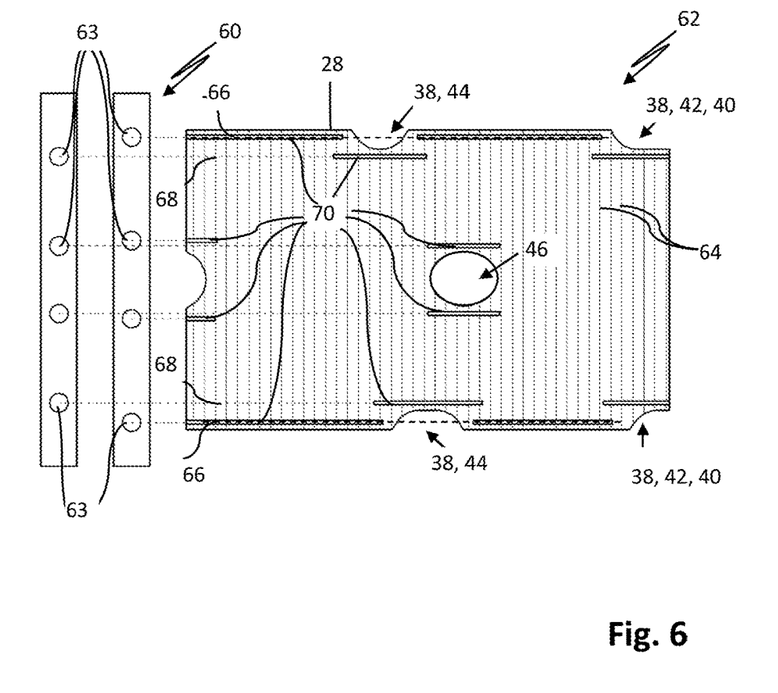
FIG. 6 shows an adhesive application device for applying adhesive onto a filter medium blank for a filter element according to FIG. 1 or FIG. 4, in plan view.

An adhesive application device 60 which is schematically illustrated greatly simplified in FIG. 6 and illustrated only in sections serves for manufacturing a filter element as shown in connection with the FIGS. 1 to 4. The adhesive application device 60 enables the targeted application of adhesive on a filter medium blank 62 of which the respective filter body 14 of the filter element embodied as a plate filter element or round filter element is formed. The filter medium blank 62 corresponds thus to the respective filter medium 18 of the filter element in the developed state. The adhesive application device comprises a plurality of nozzles 63 which serve for targeted adhesive application on the filter medium blank 62 required for the end edge bonding and the bonding of the folds 20 to be formed of the filter medium.

Figure 7:
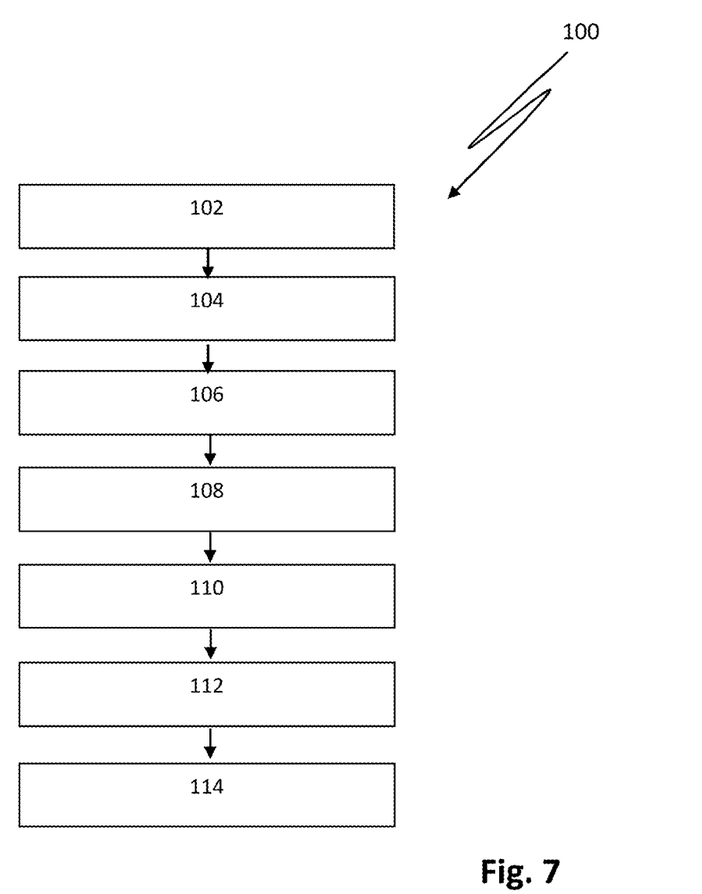
FIG. 7 shows individual method steps of a method according to the invention for producing a filter element.

In the following, the manufacturing method 100 according to the invention for an afore described filter element 10 will be explained with additional reference to FIG. 7. In a first step 102, the filter medium blank 62 is provided which is to be folded in a zigzag shape along predetermined fold lines 64 extending from a first longitudinal side 28 to an oppositely arranged second longitudinal side 28 of the filter medium blank 62. The fold lines 64, as needed, can be embossed in the material of the filter medium blank 62.

In a further step 104, at least a recess 38 in the region of one of the two longitudinal sides 28 or in a corner region 40 of the filter medium blank 62 is produced, in particular punched.

In a further step 106, along both longitudinal sides 28 of the filter medium blank 62, a first linear adhesive application path 66 is defined or predetermined, wherein the two first adhesive application paths 66 are arranged so as to extend parallel to each other and at least one of the two adhesive application paths 66 intersects the recess 38.

In a further step 108, a second linear adhesive application path 68 along the longitudinal side 28 of the filter medium blank 62 comprising the recess 38 is defined, wherein the second adhesive application path 68 is arranged so as to extend between the two first adhesive application paths and spaced apart thereto, without thereby intersecting the recess 38.

In a subsequent step 110, adhesive 70 is applied on the filter medium blank 62 along the two first adhesive application path 66, wherein the adhesive application along the first adhesive application path 66 follows the outer contour of the filter medium blank 62 transverse to the fold direction and in the region of the at least one recess 38 is interrupted or stopped and, instead, adhesive is applied along the second adhesive application path 68 on the filter medium blank 62 such that the adhesive application along the second adhesive application path 68, in transverse direction to the fold direction, is applied spaced apart from the first adhesive application path 66, and wherein the two adhesive application paths 66, 68 bond at least one common fold of the filter medium blank 62.

In a subsequent step 112, the filter medium blank 62 is folded in a zigzag shape to form the filter body 14 so that the fold ends of the filter body 14 or of the filter medium 18 are sealed by means of the end edge bonding 50 formed by the cured adhesive 70.

In a further step 114, the seal 34 is applied to the filter body 14. This can be realized by means of gluing, welding or molding or foaming the seal 34 to the filter body 14.

Figure 8:
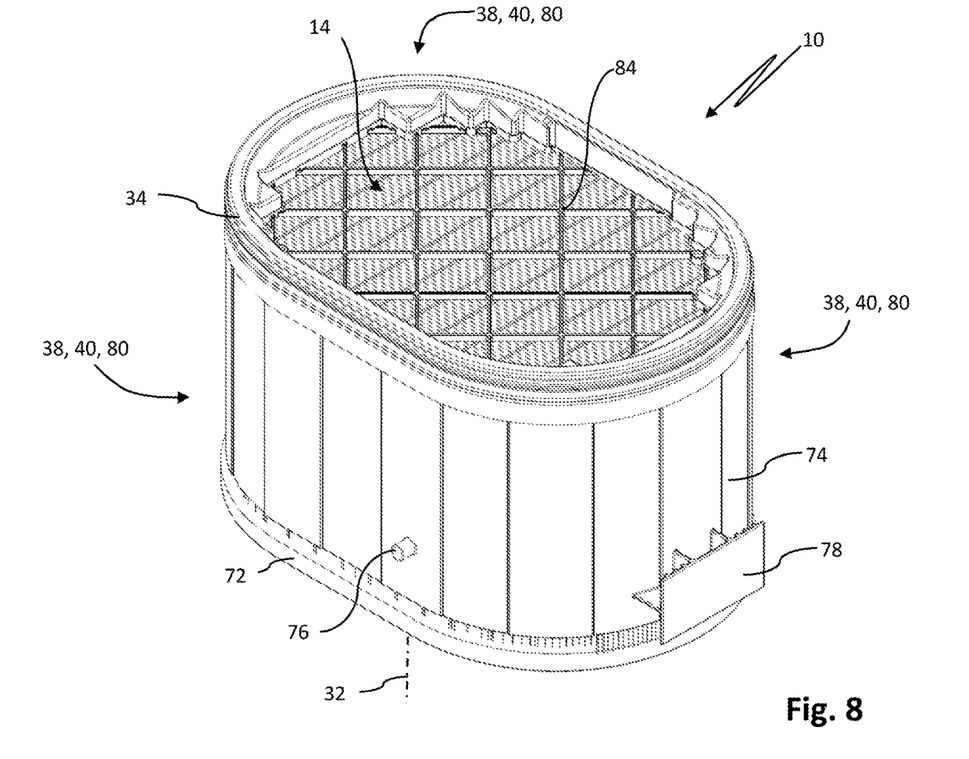
FIG. 8 shows a flat oval filter element, wherein a filter body at its outer contour comprises recesses in the form of rounded portions which are sealed by a plurality of bonding segments spaced apart from each other, in a perspective view.
Figure 9:
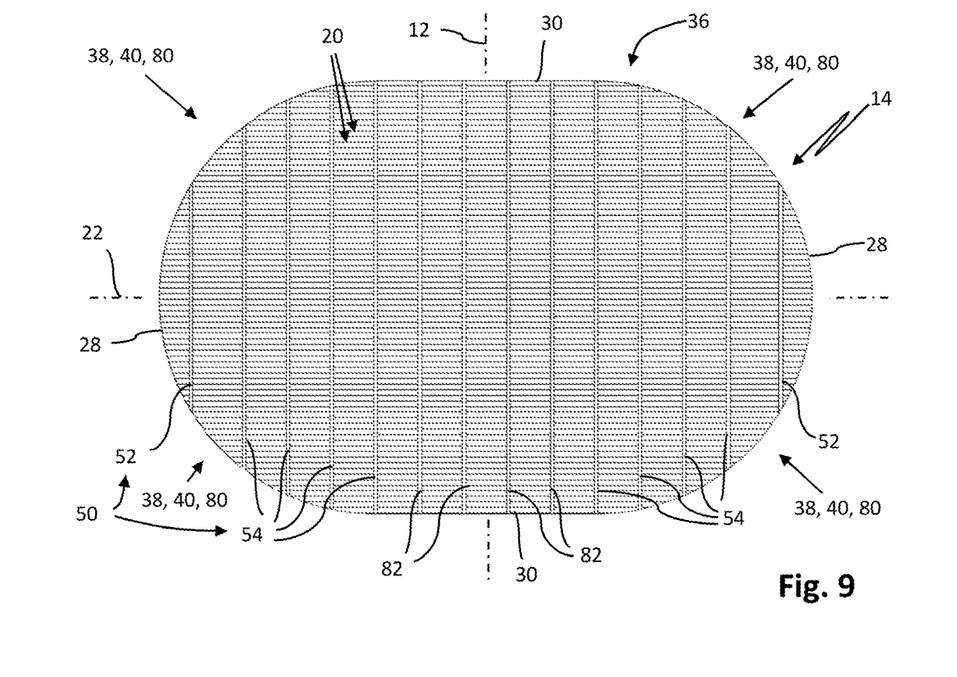
FIG. 9 shows the filter body of the filter element according to FIG. 8 in an exposed plan view, wherein a rounded course of the longitudinal sides can be seen.

FIG. 8 shows a further filter element 10 that is embodied substantially oval in the plan view. More precisely, the cross section of the filter element 10 is of stadium shape with two rounded and two parallel sides. A filter body 14 of the filter element 10 is illustrated in FIG. 9. The filter body 14 comprises a plurality of folds 20 following each other in longitudinal direction 12. The filter element 10 can be flowed through in direction of a flow axis 32 (in FIG. 8 from the bottom to the top). At the clean side, a circumferentially extending seal 34 is applied to the filter body 14. In the installed state, the seal 34 seals the filter element 10 relative to the filter housing, not illustrated in detail here. At the raw side, the filter body 14 can be framed by a circumferentially extending frame 72. The frame 72 can serve for raw-side sealing and stabilization or protection of the filter body 14. A wall surface of the filter body 14 can be surrounded by an envelope 74. The envelope 74 can engage the seal 34, in particular the envelope 74 can have a section that serves as a seal carrier. The envelope 74 can have elements 76 for supporting the position of the filter element 10 in the filter housing at both sides. The element 76 can be in the form of a round pin. Moreover, the envelope 74 can have a grip element 78 for gripping the filter element 10.

The filter body 14 is presently embodied oval with two parallel sides. In corner regions 40, the filter body 14 has recesses 38 in the form of convex rounded portions 80.

First bonding segments 52 of an end edge bonding 50 are extending at longitudinal sides 28 of the outer contour 36. The first bonding segments 52 extend in longitudinal direction 12 or transverse to the fold direction 22 and follow the contour of the longitudinal sides 28 at a changing distance. The first bonding segments 52 are here of a continuous configuration and extend between two recesses 38 positioned opposite each other in longitudinal direction 12, respectively.

In fold direction 22 within the two first bonding segments 52, the filter body comprises a plurality of second bonding segments 54. The second bonding segments 54 can also extend continuously between recesses 38 or end faces 30 oppositely positioned relative to each other in longitudinal direction 12.

In fold direction 22 within the (innermost) second bonding segments 54, the filter body 14 can comprise one or a plurality of third bonding segments 82. The third bonding segments 82 can extend continuously between end faces 30 oppositely positioned relative to each other in longitudinal direction 12.

The first, second, and third bonding segments 52, 54, 82 are here embodied respectively in a straight line and parallel to each other. In particular the first bonding segments 52 can also be curved like the outer contour 36 (not illustrated in detail). Due to the continuous extension in longitudinal direction 12 (here transversely to the fold direction 22) in particular of the second and third bonding segments 54, 82, the filter body 14 is stabilized. Moreover, the continuous bonding segments 52, 54, 82 provide a guiding action of the air flow parallel to the flow axis 32.

The bonding segments 52, 54, 82 are spaced apart from each other, respectively. In other words, neighboring bonding segments 52, 54, 82 do not contact each other. Insofar, the bonding segments 52, 54, 82 of the end edge bonding 50 are discontinuous relative to each other.

First and second bonding segments 52, 54 neighboring each other in pairs bond at least one common fold, respectively. Due to the continuous extension, first and second bonding segments 52, 54 neighboring each other in pairs bond respectively all folds 20 in the region of the extension of the respective shorter bonding segment.

In particular in the region of the recesses 38, the seal 34 extends from the outer contour 36 or from the end faces 30 transversely to the fold direction 22 inwardly to some extent. The seal 34 covers in this context at least one fold 20, respectively, which is commonly bonded by neighboring first and second bonding segments 52, 54. In other words, ends of the folds 20 which are cut for forming the recess 38 are covered by the seal 34. The seal 34 projects inwardly past the fold 20 which is positioned in longitudinal direction 12 (in transverse direction to the fold direction 22) farthest inwardly and commonly bonded by a pair of first and second bonding segments 52, 54. The seal 34 can be provided with a stepped course at the inner side in the region of the recesses 38.

A grid structure 84 can stabilize additionally the filter element 10 and in particular the seal 34. The grid structure 84 can engage the seal 34 and can also stabilize the latter.

Figure 10:
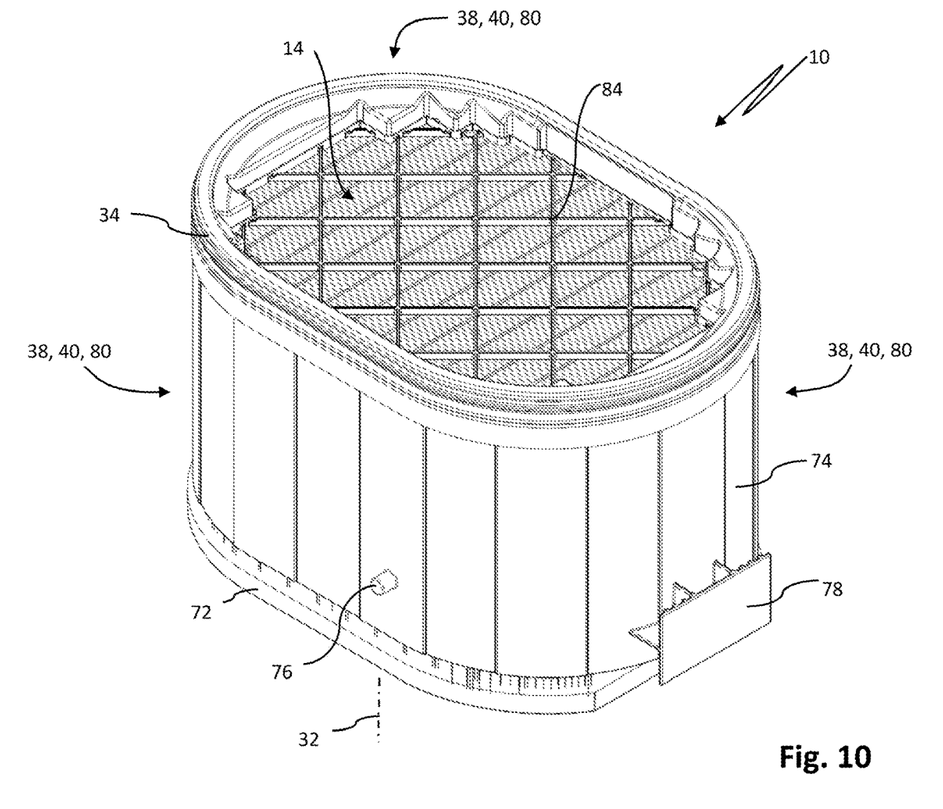
FIG. 10 shows a similar filter element as in FIG. 8 in a perspective view.
Figure 11:
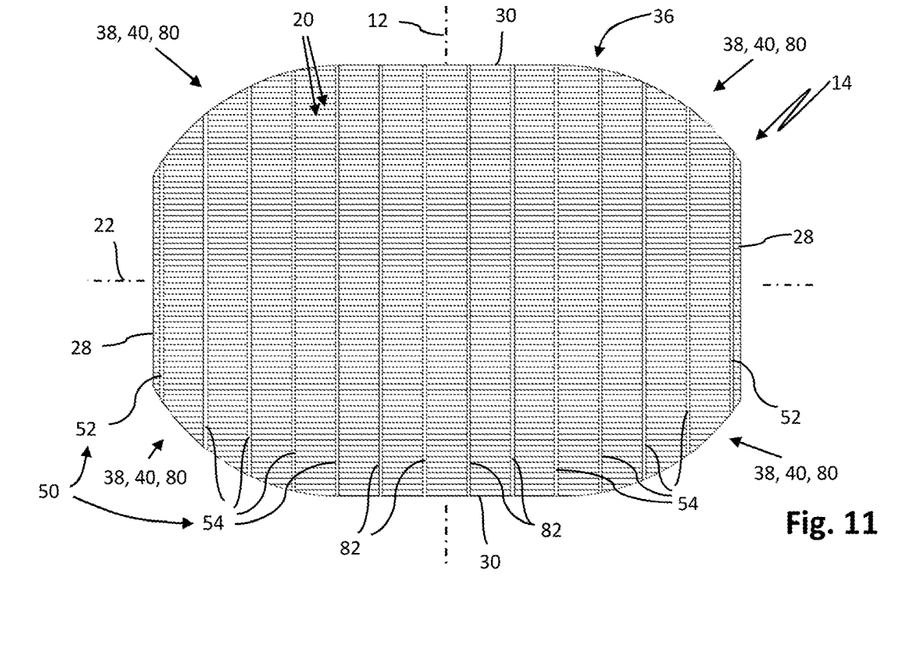
FIG. 11 shows the filter body of the filter element according to FIG. 10, wherein longitudinal sides are embodied straight in sections thereof, in an exposed plan view.

FIG. 10 shows a further filter element 10 with a filter body 14 illustrated in FIG. 11 which in its configuration correspond substantially to the filter element 10 of FIG. 8 and the filter body of FIG. 9. In the embodiment illustrated in FIGS. 10 and 11, the longitudinal sides 28 of the filter body 14 extend straight. The first bonding segments 52 extend parallel to the straight longitudinal sides 28. The frame 72 also comprises a straight course in the region of the longitudinal sides 28. In contrast thereto, the seal 34 as well as the envelope 74 can be embodied oval, thus also rounded in the region of the longitudinal sides 28. In particular, the seal 34 can project from the first bonding segments 52 in fold direction 22 past the outer contour 36 of the filter body 14, respectively. In other respects, reference is being had to the above description.

In summarizing the above, the invention concerns a filter element 10 for filtering a fluid, in particular air, with a filter body 14 with a filter medium 18 folded in a zigzag shape, whose folds 20 extend in a fold direction 22 and which is provided with an end edge bonding 50 for sealing its fold ends. The end edge bonding 50, in the region of at least one recess 38 of an outer contour 36 of the filter body 14, comprises at least one outwardly arranged first bonding segment 52 and comprises a second bonding segment 54 inwardly positioned in fold direction 22, wherein the first and the second bonding segments 52, 54 are arranged spaced apart from each other, and wherein the two bonding segments 52, 54 bond at least one common fold 20. In the region of the recess 38, a seal 34 of the filter element 10 extending from the outer contour 36 can cover transverse to the fold direction 22, preferably at the clean side, at least one fold 20 bonded by the first bonding segment 52 as well as the second bonding segment 54. The recess 38 can be a rounded portion extending at least in sections around a flow axis 32. In this way, an oval, for example, stadium-shaped, or round outer contour 36 of the filter element 10 can be obtained. The bonding segments 52, 54 can extend in a straight line transversely to the fold direction 22, respectively.

What is claimed is:

1. A filter element for filtering a fluid, the filter element comprising:
    a filter body with a filter medium folded in a zigzag shape with folds extending in a fold direction;
    the filter body comprising an end edge bonding sealing fold ends of the folds;
    the filter body comprising an outer contour with one or more recesses;
    wherein the end edge bonding, in a region of the one or more recesses of the outer contour of the filter body, is embodied discontinuously;
    wherein the end edge bonding comprises at least one outwardly positioned first bonding segment and further comprises an inwardly positioned second bonding segment positioned inwardly in the fold direction relative to the at least one outwardly positioned first bonding segment;
    wherein the inwardly positioned second bonding segment, in a transverse direction relative to the fold direction, is arranged at a spacing to the at least one outwardly positioned first bonding segment;
    wherein the at least one outwardly positioned first bonding segment and the inwardly positioned second bonding segment bond at least one common fold.

2. The filter element according to claim 1, wherein the at least one outwardly positioned first bonding segment follows the outer contour of the filter body in the transverse direction relative to the fold direction.

3. The filter element according to claim 2, wherein the at least one outwardly positioned first bonding segment follows the outer contour of the filter body in a straight line.

4. The filter element according to claim 1, wherein the at least one outwardly positioned first bonding segment is discontinuously embodied in relation to the one or more recesses.

5. The filter element according to claim 1, wherein the inwardly positioned second bonding segment is discontinuously embodied.

6. The filter element according to claim 1, wherein the at least one outwardly positioned first bonding segment and/or the inwardly positioned second bonding segment is continuously embodied in the transverse direction relative to the fold direction.

7. The filter element according to claim 1, wherein the inwardly positioned second bonding segment extends in the transverse direction relative to the fold direction.

8. The filter element according to claim 7, wherein the inwardly positioned second bonding segment extends in a straight line in the transverse direction relative to the fold direction.

9. The filter element according to claim 1, wherein the inwardly positioned second bonding segment begins and ends at an outer contour of the one or more recesses.

10. The filter element according to claim 1, wherein the inwardly positioned second bonding segment begins and ends at a spacing from an outer contour of the one or more recesses.

11. The filter element according to claim 1, wherein the one or more recesses are arranged in a corner region of the filter body.

12. The filter element according to claim 1, wherein the filter medium comprises a passage cutout, wherein the folds of the filter body at both sides of the passage cutout are sealed relative to the passage cutout by a bonding.

13. The filter element according to claim 1, wherein the outer contour of the filter body, at least in sections thereof, extends curved.

14. The filter element according to claim 13, wherein the outer contour of the filter body extends convexly curved.

15. The filter element according to claim 1, further comprising a plurality of said inwardly positioned second bonding segment spaced apart from each other, wherein the plurality of said inwardly positioned second bonding segment include neighboring second bonding segments bonding at least one common fold, respectively.

16. The filter element according to claim 1, wherein the filter element is a flat filter element or a round filter element.

17. The filter element according to claim 1, further comprising a seal, wherein, in a region of the one or more recesses, the seal covers, extending from the outer contour in the transverse direction relative to the fold direction, at least one of the folds bonded by the at least one outwardly positioned first bonding segment and by the inwardly positioned second bonding segment.

18. The filter element according to claim 17, wherein the seal is arranged at a clean side of the filter element.

19. A method for producing a filter element according to claim 1, the method comprising:
    a) providing a filter medium blank configured to be folded in a zigzag shape for forming the filter body along predetermined fold lines extending from a first longitudinal side of the filter medium blank to an oppositely arranged second longitudinal side of the filter medium blank;
    b) producing one or more recesses in a region of at least one of the first and second longitudinal sides of the filter medium blank;
    c) defining a first linear adhesive application path along the first and second longitudinal sides of the filter medium blank, respectively, wherein the first linear adhesive application paths are arranged so as to extend at a spacing to each other and wherein one of the first linear adhesive application paths intersects the one or more recesses;
    d) defining at least one second linear adhesive application path along the at least one of the first and second longitudinal sides provided with the one or more recesses, wherein the at least one second linear adhesive application path is arranged so as to extend between the first linear adhesive application paths and parallel thereto, without intersecting the one or more recesses;
    e) applying an adhesive on the filter medium blank by following the outer contour of the filter medium blank in the transverse direction relative to the fold direction along the first linear adhesive application paths and interrupting or stopping an adhesive application in the region of the one or more recesses and, instead, carrying out the adhesive application in the region of the one or more recesses along the at least one second linear adhesive application path in the transverse direction relative to the fold direction at a spacing from the one of the first linear adhesive application paths intersecting the one or more recesses; and
    f) erecting the filter medium blank to a filter medium folded with folds in a zigzag shape so that fold ends of the folds of the filter medium are sealed by the end edge bonding formed by the adhesive, wherein the adhesive, applied along the at least one second linear adhesive application path and along the one of the first linear adhesive application paths intersecting the one or more recesses, bonds at least one common fold of the filter medium.

20. The method according to claim 19, further comprising:
providing the filter medium blank with a passage cutout;
defining two third linear application paths extending parallel to each other at both sides of the passage cutout on the filter medium blank;
applying the adhesive along the two third linear application paths such that folds extending toward the passage cutout after erecting the filter medium blank are sealed by bonding formed by the adhesive applied along the two third linear application paths.

21. The method according to claim 19, further comprising selecting a hot melt as the adhesive.

* * * * *